July 15, 1941.            W. V. LAY                 2,249,316
                     VAGINAL DIAPHRAGM
                     Filed July 6, 1940
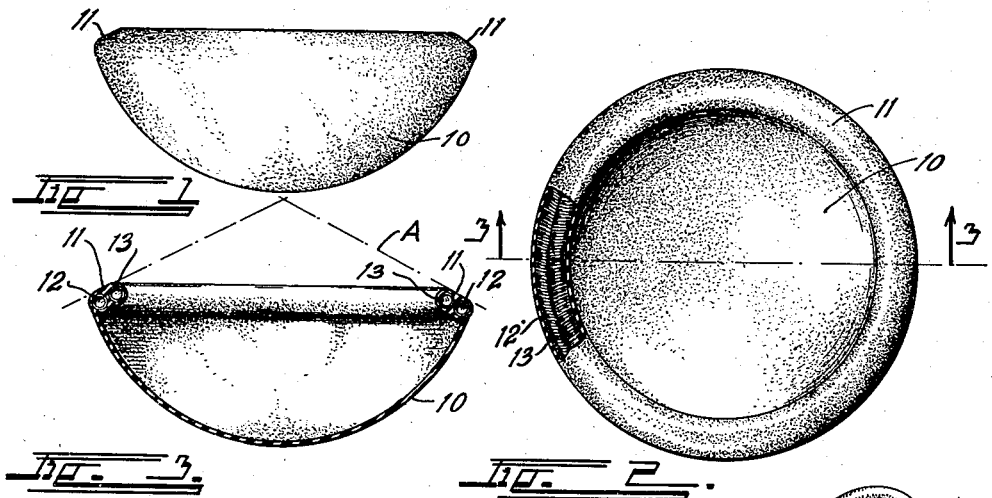
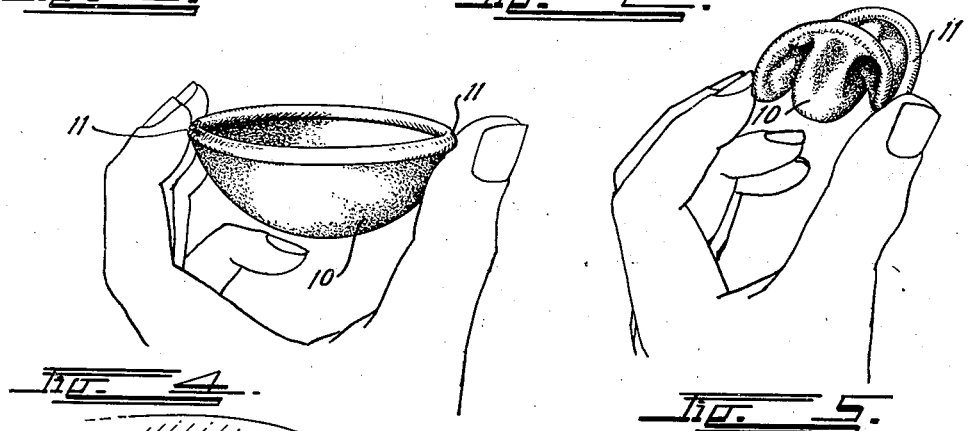
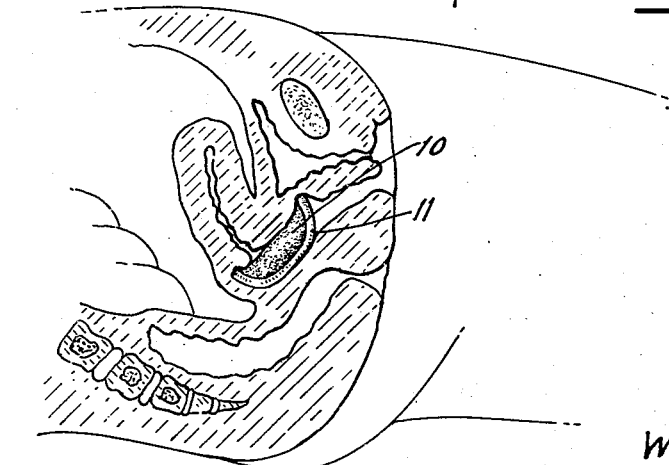
INVENTOR.
WILLARD V. LAY.

Patented July 15, 1941

2,249,316

UNITED STATES PATENT OFFICE 2,249,316

VAGINAL DIAPHRAGM

Willard V. Lay, Denver, Colo.

Application July 6, 1940, Serial No. 344,196

1 Claim. (Cl. 128—127)

This invention relates to a vaginal diaphragm for use in applying medical preparations and for all other purposes for which such diaphragms are used by the medical and surgical profession. It is more particularly designed as an improvement over the diaphragm described in applicant's copending applications, Serial Nos. 297,026 and 324,656.

The principal object of the invention is to provide a diaphragm construction which will automatically maintain the diaphragm in the correct position both during insertion and when in place in the patient.

Other objects are to provide a vaginal diaphragm of the character which cannot and will not twist into a spiral when the two sides are tightly compressed together for insertion.

It is the consensus of medical opinion that to be fully effectual a vaginal diaphragm should arch or bow when in place so as to clamp itself in place over the selected area. It has been found that when a diaphragm of the type having a single annular coil spring in its periphery is compressed laterally the spring remains in the same flat plane and does not form a "bow" or arc in either direction. When a plurality of springs are used and positioned on an angle, as shown in applicant's prior application, 324,656, the diaphragm will always bow in one direction only. With a plurality of springs so positioned, however, there is a tendency for the entire diaphragm to form itself into a spiral twist due to the spiral nature of the annular rim springs. Both such diaphragms are difficult to insert correctly and often after the insertion the body movements may cause the entire diaphragm to reverse or change its position in the vagina. This invention has been designed to obviate the above difficulties of both types of spring type diaphragms.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved vaginal diaphragm.

Fig. 2 is a plan view thereof partially broken away to show the interior rim construction.

Fig. 3 is a cross section therethrough, taken on the line 3—3, Fig. 2.

Figs. 4 and 5 are perspective views illustrating the action of the diaphragm when subjected to side compression.

Fig. 6 is a diagrammatic sagittal section illustrating a position of the diaphragm in the vagina.

The improved diaphragm comprises a thin, flexible, loose, impervious, membrane 10, preferably of thin flexible rubber. The membrane is supported from a relatively stiff flexible rim member 11.

The rim member contains two annular helical wire springs an outer spring 12 and an inner spring 13, which are imbedded in, and enclosed in, a rubber cover forming the rim member 11. The cover of the rim member and the membrane 10 are preferably formed integrally with the latter depending from the outer periphery of the former.

One of the principal features of the invention resides in the manner of forming and placing the springs 12 and 13. The two springs differ both in their annular diameter and in their direction of wind. One of the springs is wound on a left hand spiral and the other on a right hand spiral. Apparently, it does not matter which spring is "left" and which is "right," but it is important that they be oppositely wound.

The outer spring 12 has a larger annular diameter than the inner spring 13. The difference in diameter is not sufficient, however, for the two springs to lie in the same plane. The outer spring 12 does not completely surround the outer periphery of the inner spring 13 but lies to one side thereof, that is, on the side toward the membrane 10.

This angular placement of the springs places the rim member in a conical plane about the axis of the rim member as indicated in broken line at "A," Fig. 1. This angular construction is for the purpose of grinding and maintaining the angle of bend of the diaphragm.

It will be noted that any side pressure on the rim member, such as being exerted by the hand in Figs. 4 and 5 comes against the outer spring 13 and the latter acts against the inner spring to one side of the latter. This forces the rim member to always bow toward the open face of the diaphragm, as illustrated in Fig. 5, and to always maintain this direction of bow while under the side pressure of the walls of the vagina.

This enables the physician to easily insert the diaphragm with its "bow" or curve in the desired direction with assurance that it will maintain the preset direction until removed without change or twist.

If the two springs are wound in the same direction, the rim member has a tendency to twist when the two sides are forced together. This twist is a result of the deformation of the spirals of the springs and makes it very difficult to insert and retain the diaphragm. When two springs wound in opposite directions are used, however, one tends to twist in one direction and the other in the opposite direction and as a result the two tendencies are counteracted so that the assembled rim member has no twisting tendency whatever.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

In a vaginal diaphragm of the type having an annular rim and a circular flexible diaphragm secured around its periphery to said rim, means for preventing twisting and causing arcing of the orifice defined by said rim when the latter is subjected to side compression comprising a first annular coiled spring wound in one direction and imbedded in said rim about said orifice, and a second annular coiled spring of larger annular diameter than the first spring imbedded in said rim concentrically with said first spring, said second spring being wound in a spiral of opposite hand from said first spring.

WILLARD V. LAY.